3,702,821
SERUM THYROXINE ANION EXCHANGE RESIN
Alberto Antonio Fernandez, Canoga Park, Calif., assignor to Biochemical Procedures, Inc., Hollywood, Calif.
Filed Dec. 14, 1970, Ser. No. 97,876
Int. Cl. B01j 1/08
U.S. Cl. 210—37            12 Claims

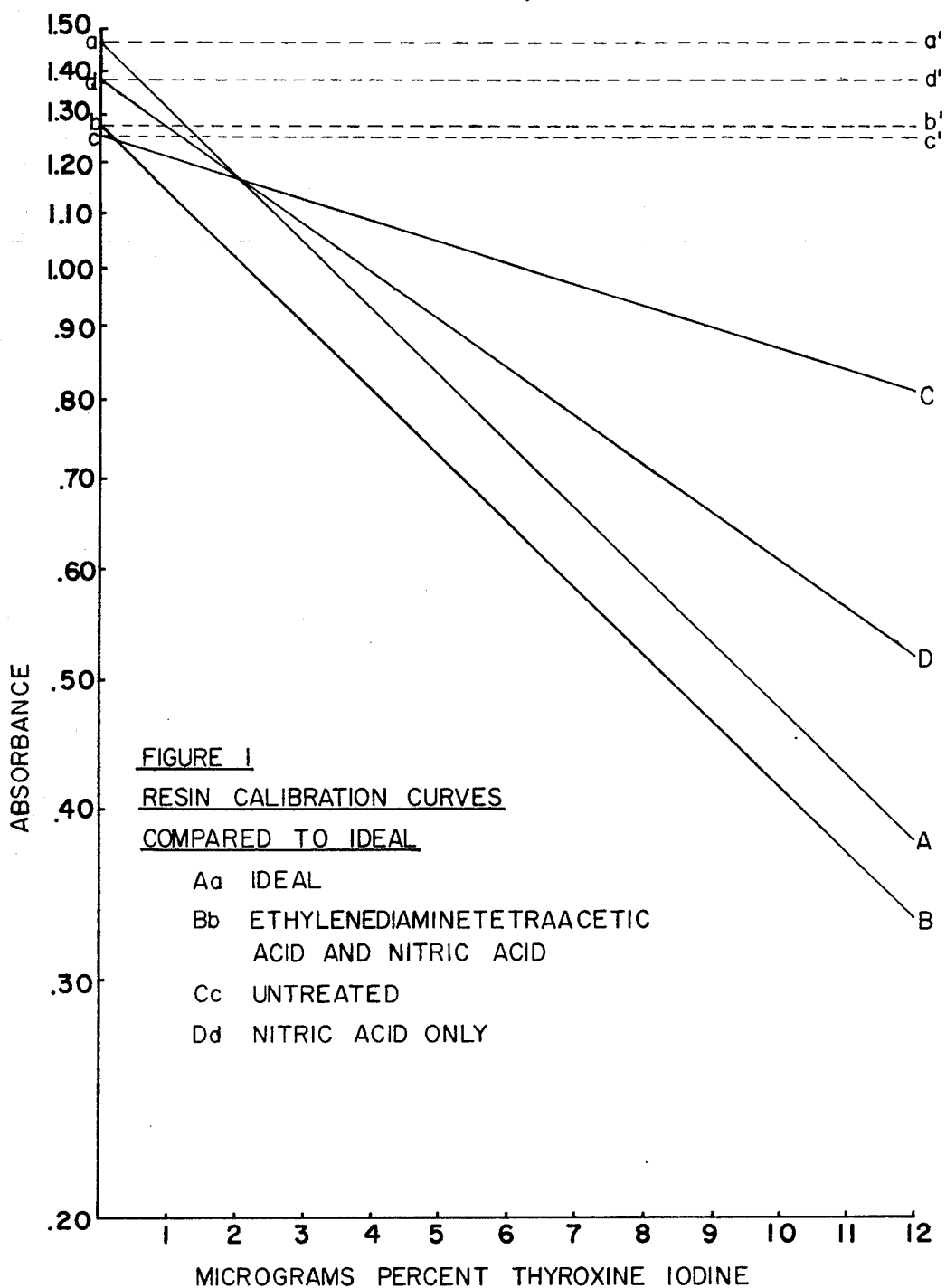

ABSTRACT OF THE DISCLOSURE

By pretreatment of a strong base quaternary ammonium anion exchange resin with an aqueous solution of a chelating agent, more efficient elution of thyroxine therefrom in biological isolation and analytical procedures is achieved. A further improvement is achieved by pretreatment of the resin with nitric acid.

Field of the invention

This invention involves a method for treating an anion exchange resin to improve its efficiency in chromatographic processes for the recovery of thyroxine from dilute aqueous solutions including biological fluids. The treated resin is particularly useful in blood analysis processes wherein thyroxine, an anionic constituent, is separated from the liquid by means of the ion exchange resin.

Description of the prior art

Thyroxine is the circulating thyroid hormone. Its concentration in the blood serum is maintained by the thyroid gland and the magnitude of this value is used by physicians as a reflection of thyroid activity. Thyroxine blood serum concentration is thus an important clinical laboratory determination. The most commonly used procedure for some time was the so-called PBI or protein bound iodine determination. This method involved precipitation of the blood serum proteins which were then ashed and analyzed for iodine. This method was rather crude since it was nonspecific. An improvement on the PBI method involved the determination of butanol extractable iodine (BEI) which had the advantage of being more specific for thyroxine, but the disadvantage of being considerably more laborious and time-consuming. An improved method of this type is described by Masen in U.S. Pat. No. 3,389,968 patented June 25, 1968.

Ion exchange chromatographic procedures are becoming of increasing popularity for the determination of thyroxine in blood serum because of their speed, simplicity, and improved specificity. They rely on the adsorption of thyroxine directly from the blood serum by a strong base anion exchange resin of the quaternary ammonium type. They have evolved from research by Galton and Pitt-Rivers reported in Biochemical Journal 72, 310–313 (1959) and by Pileggi, Lee, Golub, and Henry in J. Clin. Endocrinology and Metabolism 21, 1272–1279 (1960). An improved method of this type in which a divinylbenzene crosslinked polystyrene quaternary ammonium resin in the acetate form is used is described by Bittner in U.S. Pat. No. 3,471,553 patented Oct. 7, 1969. Resins pretreated according to the present invention may be employed in the serum thyroxine analytical procedure described in the Bittner patent.

SUMMARY OF THE INVENTION

Prior resin adsorption methods for the determination of thyroxine in biological fluids and particularly in blood serum have suffered from the disadvantage that the thyroxine was rather tenaciously retained by the resin after adsorption from the blood serum and that relatively large volumes of eluting solvents were required for its removal. This is inconvenient for routine use, particularly in automated equipment. In some instances low recoveries of thyroxine from the resin resulted, and in others using standardized procedures results were not reproducible with different batches of resin. It is one object of the present invention to provide a standardized anion exchange resin from which high recovery of thyroxine can be accomplished with relatively small volumes of eluting solvents. Other objects will be evident from the description which follows.

The central feature of the present invention involves treatment of a resin of the polystyrene divinylbenzene crosslinked quaternary ammonium type with a chelating agent prior to use for the absorption of thyroxine from dilute aqueous solutions such as blood serum or other biological fluids in isolation and analytical procedures. The method is also useful in the preparation of thyroxine by chemical synthesis for isolation thereof from dilute aqueous solutions in the course of purification, isolation and resolution procedures.

Various commercial resins of the polystyrene divinylbenzene crosslinked quaternary ammonium type are available and applicable to the present method. They include the Dowex 1 and Dowex 2 of Dow Chemical Company, Amberlite 400, Amberlite 401, and Amberlite XE-269 of Rohm & Haas Company, Philadelphia, Pa., etc. The preferred resin is a low cross-linked resin having about 2% crosslinking and containing benzyltrimethylammonium exchange groups such as Dowex 1–X–2 having 2% crosslinking.

Any of the many common water soluble chelating agents are operable. They include the hydroxy and amino carboxylic acids such as tartaric acid, citric acid, $\alpha$-glucoheptonic acid, ethylenediaminetetraacetic acid, ethylene glycol-bis-(aminoetheyl ether)tetraacetic acid, etc., and inorganic anions known to have sequestering properties such as fluoride and phosphate. Other suitable chelating agents include phytic acid, nitrolotriacetic acid, and oxalic acid. It is preferred that the chelating agent be used in the form of its water soluble ammonium or alkali metal salt such as the sodium or potassium salt. By "water soluble," a solubility in water of at least 0.1% by weight is intended.

A preferred means of operation is to dissolve the chelating agent in dilute aqueous alkali metal or ammonium hydroxide having a concentration of from about 5% to 15% by weight. The chelating agent is present in a concentration of .1 to 10% by weight and preferably .5 to 1% by weight. The treatment time is not critical, from ½ to 4 hours being adequate. Generally if the solution is heated while in contact with the resin, for instance, within the range of from 50° C. to the boiling point of the solution, more efficient contact and treatment results and a shorter contact time may be employed. Sufficient of the chelating agent solution is employed to provide a fluid suspension of the resin to insure efficient contact. Mechanical agitation is generally employed with from 2 to 10 parts by volume of chelating agent solution per part by weight of resin.

It is preferred to pretreat the resin with hot dilute nitric acid prior to treatment with the chelating agent solution. This makes possible improved precision and higher absolute recoveries in blood serum analysis for thyroxine. Nitric acid pretreatment is believed to eliminate interfering trace metals from the resin which may catalyze decomposition of the thyroxine.

Nitric acid of 5 to 15% by weight concentration is preferred. The volume to be employed is determined on the same basis as described above for the chelating agent solution. Again it is preferred to employ temperatures in the range of 50° C. to the boiling point of the solution for the nitric acid pretreatment.

The foregoing treatments may be used singly according to the present invention, but for analytical use it is preferred to employ the two treatment steps in conjunction with one another with nitric acid treatment preceding chelating agent treatment. The very substantial improvement in thyroxine recovery in conventional column elution procedures achieved by the present invention will be apparent from the description of specific examples which follows. In most instances, absolute recoveries of thyroxine in excess of 90% are obtained in eluate volumes approximately equal to the resin volume when the two process steps are used in conjunction with one another to treat the resin prior to absorption of thyroxine thereon. This is quite remarkable when it is considered that the untreated resin as obtained commercially generally affords variable recoveries from batch to batch in the range of 20 to 50%. It is thus evident that the resins ordinarily used for industrial purposes are not suited for the analytical determination of serum thyroxine.

BRIEF DESCRIPTION OF THE DRAWING

FIG. 1 is a graph of absorbance of resin eluates containing thyroxine plotted as ordinate on a logarithmic scale versus concentration of thyroxine as abscissa expressed in terms of mcg. percent (micrograms per 100 ml.) of thyroxine iodine contained therein. Lines Bb and Dd are calibration curves for the resins of Examples 2 and 1 respectively prepared by passing various standard solutions of thyroxine through columns of those resins and measuring the thyroxine iodine content of the eluates by the cericarsenious acid reaction. Line Aa represents the ideal recovery obtainable and is a graph of absorbance vs. concentration of the various standard thyroxine solutions prior to contacting with any resin. Line Cc is the calibration curve for the untreated resin used as raw material in Example 1.

DESCRIPTION OF SPECIFIC EMBODIMENTS

Example 1.—Resin pretreatment with nitric acid

A trimethylbenzyl quaternary ammonium anion exchange resin, 250 g., in which the benzyl groups are part of a divinylbenzene crosslinked polystyrene matrix in which the proportion of divinylbenzene crosslinking is 2% (Dowex 1-X-2 of Dow Chemical Company, Midland, Michigan) and having a particle size of 100–200 mesh and in the chloride form is suspended by means of mechanical stirring in 1 l. of 10% aqueous nitric acid solution. The suspension is heated to boiling for about 1 hr. The resin is then allowed to settle and the supernatant liquid is decanted. The residual resin is washed with distilled water until the washes are no longer acidic. The resin is then collected on a filter and is ready for loading into a column for use in serum thyroxine assay.

The concentration of the nitric acid solution used in Example 1 may be varied within the range of 5 to 15% by weight. Heating is not essential but is preferred especially when using the more dilute nitric acid solutions. When room temperature treatment is employed a somewhat longer period of agitation in the nitric acid solution is desirable. Treatment times in the range of about ½ to 4 hours are adequate. The volume of 5–15% aqueous nitric acid used for treatment is not critical so long as sufficient acid is used to provide a fluid suspension of the resin. Usually from 2 to 10 parts by volume of aqueous acid per part by weight of wet resin are adequate.

Example 2.—Chelating agent treatment, ethylenediaminetetracetic acid

The resin after treatment according to Example 1, 250 g., is resuspended in 1 l. of 10% aqueous sodium hydroxide containing 5 g. of ethylenediaminetetraacetic acid with mechanical agitation. The mixture is heated for 1 hr. at the boiling point. Again the resin is permitted to settle and the supernatant liquid is decanted. The resin is then washed with distilled water until the discarded wash solution is no longer alkaline. It is then collected on a filter and is ready for use in serum thyroxine assay.

The trimethylbenzyl quaternary ammonium anion exchange resin raw material of Example 2 need not be first treated according to Example 1. An improved resin for isolation and analytical procedures is obtained by treatment of the commercial resin according to Example 2 alone.

Examples 3–11.—Substitution of other chelating agents

The chelating agents listed in the following table were substituted on an equal weight basis for ethylenediaminetetraacetic acid in the procedure of Example 2. Calibration curves for each of these resins, for those described in Examples 1 and 2, and for the resin used as raw material were prepared as described below and the recovery efficiencies for the resins were calculated. The recovery efficiencies are also shown in the table.

RECOVERY EFFICIENCIES OF THE RESINS TREATED ACCORDING TO EXAMPLES 1-11

| Example No. | Chelating agent | Percent recovery |
| --- | --- | --- |
|  | None, untreated Dowex 1 x 2 | *33 |
| 1 | None, nitric acid treatment only | *69 |
| 2 | Ethylenediamine tetraacetic acid | *92 |
| 3 | Oxalic acid | 73 |
| 4 | Sodium fluoride | 76 |
| 5 | Ethylene glycol, bis-(aminoethyl ether) tetraacetic acid | 76 |
| 6 | Citric acid | 79 |
| 7 | Trisodium phosphate | 83 |
| 8 | Sodium α-glucoheptonate | 85 |
| 9 | Nitrilotriacetic acid | 85 |
| 10 | Phytic acid | 85 |
| 11 | Tartaric acid | 91 |

*Average of 3 separate determinations.

In Examples 2–11, the chelating agent solutions had concentrations of 0.5%. More dilute solutions of about 0.1% by weight concentration, or more concentrated solutions of up to about 10% by weight concentration may be satisfactorily used. By the use of concentrations in excess of 0.5%, improvement in the properties of the resin sometimes results, but ordinarily 0.5% is sufficient and is preferred. Similarly, heating at this stage is not essential but heating within the range of 50° C. to about the boiling point of the solution is preferred.

The chelating agents are preferably used in anionic form for instance in alkaline solution as in Example 2 where 10% aqueous sodium hydroxide is specified. Sodium hydroxide solutions of from 5 to 15% concentrations may be used. Other water soluble alkali metal hydroxides such as lithium or potassium hydroxide or ammonium hydroxide may be substituted.

Preparation of calibration curves (1) Chromatographic columns 0.8 cm. in diameter were prepared by placing a plug of glass wool in the bottom of the column, and adding a slurry of the resin sufficient to provide a resin column 4.0 cm. in length. Seven columns were prepared for each resin.

(2) Each column was next washed with 6 ml. of 0.1 N sodium hydroxide to convert the resin to the hydroxide form, and allowed to drain.

(3) Standard thyroxine solutions containing amounts of L-thyroxine corresponding to 2, 4, 6, 8, 10 and 12 mcg. percent of thyroxine iodine were prepared as follows. Analytically pure L-thyroxine, 153.1 mg., was dissolved in 1 l. of distilled water. Each milliliter of this solution contained 100 mcg. of iodine combined as L-thyroxine. An aliquot of this stock solution, 1 ml., was diluted to 100 ml. with distilled water to give "thyroxine working stock" solution containing an amount of thyroxine equivalent to 1 mcg./ml. of iodine. "Thyroxine working standard" was prepared by diluting respectively 2, 4, 6, 8, 10 and 12 milliliters of the "thyroxine working stock" solution to 100 ml.

(4) One milliliter of each "thyroxine working standard" solution was next diluted with 5 ml. of 0.1 N sodium hydroxide and poured onto a separate column containing the test resin. The seventh column, which served as a blank, was treated in the same way but 1 ml. of distilled water was substituted for the "thyroxine working standard."

(5) Each column was next washed with two 7.5 ml. portions of a solution of "acetate alcohol" containing 17.5 g. of anhydrous sodium acetate in 2.1 of 50% v./v. aqueous isopropanol adjusted to pH 7.2 with concentrated acetic acid. The column was allowed to drain and the effluent discarded.

(6) Each column was next washed with two 7.5 ml. portions of 15% v./v. aqueous acetic acid, allowed to drain, and the effluent discarded.

(7) The columns were next primed preparatory to elution by accurately pipeting into each column 0.5 ml. of concentrated acetic acid and again allowing the columns to drain, and the effluent discarded.

(8) Elution of the thyroxine from the column was then conducted using 50% v./v. aqueous acetic acid, 4 ml., which was accurately pipetted into each column. The eluates were collected and retained for spectrophotometric measurement of the iodine concentration by the ceric-arsenious acid reaction.

(9) This and the following steps deal with the ceric-arsenious iodine determination. A 1 ml. aliquot of each eluate is placed in a previously marked test tube and mixed with 1.3 ml. of 4 N sulfuric acid and 0.5 ml. of bromate reagent prepared as follows. In a 2 l. volumetric flask 2.9 g. of potassium bromide and 0.9 g. of potassium bromate is dissolved in approximately 1.5 l. of distilled water. The solution is adjusted to pH 10-11 with sodium hydroxide and diluted to 2 l.

(10) Arsenious reagent, 2.6 ml., prepared as follows was then added to each test tube. Dissolve 10 g. of arsenic trioxide in 200 ml. of distilled water containing 3 g. of sodium hydroxide in a 2 l. volumetric flask. Approximately 1 l. of cold distilled water was next added slowly with mixing, and then 55 ml. of concentrated sulfuric acid was added. When the solution had cooled to room temperature it was diluted to 2 l. with cold distilled water.

(11) To each test tube 1.28 ml. of ceric reagent was added. The tubes were mixed well and incubated in a water bath at 42° C. for exactly 20 min. The ceric reagent was prepared as follows. Concentrated sulfuric acid, 225 ml., was carefully mixed with 1500 ml. of cold distilled water contained in a 2 l. volumetric flask. Ceric ammonium sulfate, 20 g., was then added to the solution which was allowed to cool to room temperature. It was then diluted to 2 l. with cold distilled water.

(12) After the 20 minute incubation period, the absorbance at 420 mµ was measured spectrophotometrically. The logarithm of absorbance was then plotted vs. mg. percent iodine equivalent for each solution tested using semilogarithm paper for convenience.

(13) An "ideal reference curve" was prepared for comparison. A 1 ml. aliquot of each "thyroxine working standard" was diluted with 1 ml. of conc. acetic acid and then diluted to 4 ml. with 50% v./v. aqueous acetic acid. The solution was thoroughly mixed and 1 ml. thereof was then assayed without contacting with any resin by the ceric-arsenious reaction in the same way as described for the resin eluates in Steps 9-12 above. Line Aa in FIG. 1 is the "ideal reference line" connecting the points plotted for log A and [I⁻] for each "thyroxine working standard" solution.

Calculation of recovery efficiency

The collection of points for the various standard solutions for a specific resin lie substantially on a straight line. The latter is in accordance with the theoretical considerations described by Acland (Biochem. J., 66, 177 (1957)), who has shown that in the reduction of $Ce^{+4}$ in the presence of added $I^-$ log A is linearly related to $[I^-]$. Referring to FIG. 1 the slope of the ideal reference line Aa is proportional to the "specific catalytic activity" of thyroxine under the experimental conditions described above. This is the maximum slope that can be obtained when thyroxine from the various standard solutions is completely recovered from the chromatographic columns by elution with the solvent used to prepare the ideal reference line. By "specific catalytic activity" is meant the change in the logarithm of absorbance produced by a change of 1 mcg. percent in the thyroxine iodine concentration in the standard solution without resin contact.

If no thyroxine were recovered from a column, the resulting graph would be a horizontal line such as aa', bb', cc', or dd'. For all intermediate recovery values, slopes varying from the horizontal to that of the ideal reference line will be obtained. Percent recoveries can be calculated from the ratios of the slopes of the resin calibration lines to the slope of the ideal reference line.

The slopes of the lines in FIG. 1 calculated geometrically are as follows: ideal reference line Aa, 0.96; ethylenediaminetetraacetic acid with nitric acid pretreatment calibration line Bb, 0.94 (Example 2); nitric acid pretreatment without chelating agent calibration line Dd 0.68 (Example 1); and untreated resin calibration line Cc, 0.30. The percent recoveries are ethylenediaminetetraacetic acid with nitric acid pretreatment, (Example 2) 98%; nitric acid pretreatment without chelating agent (Example 1) 71%; and untreated resin 31%.

Analytical method for serum thyroxine

When 1.0 ml. of the blood serum specimen in which it is desired to determine the thyroxine content is substituted for the "thyroxine working standard" in step 4 of the method described above for the preparation of calibration curves, a satisfactory analytical method for routine use is obtained. The value for thyroxine content in the test serum is obtained by interpolation of the absorbance measured in step 12 with the unknown on the calibration curve for the specific resin used.

The preceding examples deal with the process of the present invention in the context of the analytical method for the determination of serum thyroxine by ion exchange column chromatography. Resins treated in this fashion are also useful for preparative biological and chemical procedures designed for the isolation of thyroxine from other dilute aqueous solutions. Nitric acid and chelating agent treatment may be used individually or in combination. When both are used for resin pretreatment, the nitric acid treatment should precede the chelating agent treatment. For the analytical determination of serum thyroxine by ion exchange column chromatography the combination of nitric acid pretreatment followed by chelating agent treatment is preferred.

Although it is not intended that the present invention be limited by any theoretical interpretation it is believed that the nitric acid treatment serves principally to remove metallic contaminants from the resin which may catalyze decomposition of the thyroxine. It is further theorized that the chelating agent saturates irreversible binding sites of the resin which would otherwise tenaciously retain absorbed thyroxine, and result in failure of complete elution unless excessive volumes of solvent are used. The most preferred chelating agents for practice of the present invention are ethylenediaminetetraacetic acid and tartaric acid. Good but somewhat less efficient recoveries are realized if the chelating agent employed is α-glucoheptonic acid, nitrilotriacetic acid, phytic acid, or the phosphate anion. Many chelating agents in addition to these are however operable and a number of them are illustrated in the foregoing examples.

What is claimed is:

1. In a process for the separation of thyroxine from dilute aqueous solution by adsorption thereof on a cross-linked polystyrene strong base quaternary ammonium anion exchange resin and elution therefrom, the improvement which comprises pretreating said resin with an aqueous solution of a chelating agent prior to adsorption of said thyroxine thereon.

2. In a process for the separation of thyroxine from dilute aqueous solution by adsorption thereof on a cross-linked polystyrene strong base quaternary ammonium anion exchange resin and elution therefrom, the improvement which comprises pretreating said resin with an aqueous solution of nitric acid having a concentration of from 5 to 15% by weight before adsorption of said thyroxine thereon.

3. The process of claim 2 wherein said aqueous solution of nitric acid is heated at a temperature of from 50° C. to the boiling point of said solution.

4. The process of claim 2 wherein after pretreating said resin with nitric acid, but prior to adsorption of thyroxine thereon, said resin is contacted with an aqueous solution of a chelating agent having a concentration of from 0.1 to 10% by weight.

5. The process of claim 4 wherein said solution of a chelating agent contains from 5 to 15% by weight of a base selected from the group consisting of sodium hydroxide, potassium hydroxide, lithium hydroxide, and ammonium hydroxide.

6. The process of claim 4 wherein said solution of a chelating agent is heated at a temperature of from 50° C. to the boiling point of said solution.

7. The process of claim 4 wherein said chelating agent is ethylenediamine tetraacetic acid or a water soluble ammonium or alkali metal salt thereof.

8. The process of claim 4 wherein said chelating agent is a water soluble ammonium or alkali metal phosphate.

9. The process of claim 4 wherein said chelating agent is $\alpha$-glucoheptonic acid or a water soluble ammonium or alkali metal salt thereof.

10. The process of claim 4 wherein said chelating agent is nitrilotriacetic acid or a water soluble ammonium or alkali metal salt thereof.

11. The process of claim 4 wherein said chelating agent is phytic acid or a water soluble ammonium or alkali metal salt thereof.

12. The process of claim 4 wherein said chelating agent is tartaric acid or a water soluble ammonium or alkali metal salt thereof.

References Cited

UNITED STATES PATENTS

| | | | |
|---|---|---|---|
| 3,389,968 | 6/1968 | Masen | 23—230 B |
| 3,414,383 | 12/1968 | Murphy | 23—230 B |
| 3,471,553 | 10/1969 | Bittner | 210—37 X |
| 3,516,794 | 6/1970 | Murty et al. | 23—230 B |

OTHER REFERENCES

Sterling, Kenneth, et al., Resin Uptake of $I^{131}$-Triiodothyronine as a Test of Thyroid Function, J. Clin. Endocrinol. & Metab., 21, 456–464, 1961.

REUBEN FRIEDMAN, Primary Examiner

T. G. WYSE, Assistant Examiner

U.S. Cl. X.R.

23—230